United States Patent
Umezawa et al.

(10) Patent No.: US 7,396,458 B2
(45) Date of Patent: Jul. 8, 2008

(54) WASTEWATER TREATMENT EQUIPMENT

(75) Inventors: Hiroyuki Umezawa, Gunma (JP); Masahiro Iseki, Saitama (JP); Motoyuki Tsuihiji, Gunma (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 4 days.

(21) Appl. No.: 11/386,105

(22) Filed: Mar. 22, 2006

(65) Prior Publication Data
US 2006/0231472 A1    Oct. 19, 2006

(30) Foreign Application Priority Data
Mar. 22, 2005   (JP) .............................. 2005-081438

(51) Int. Cl.
*C02F 1/58*     (2006.01)
*C02F 101/14*   (2006.01)

(52) U.S. Cl. ............... 210/195.2; 210/199; 210/203; 210/205; 210/206; 210/915

(58) Field of Classification Search ................. 210/915
See application file for complete search history.

(56) References Cited

U.S. PATENT DOCUMENTS

| | | | | |
|---|---|---|---|---|
| 4,414,185 A | * | 11/1983 | Harrison | ........................ 423/163 |
| 5,443,741 A | * | 8/1995 | Stott et al. | ..................... 210/726 |
| 6,267,892 B1 | * | 7/2001 | Wada et al. | .................... 210/713 |
| 6,299,513 B1 | | 10/2001 | Tsuihiji et al. | |
| 6,344,142 B1 | * | 2/2002 | Yamasaki et al. | ........... 210/614 |
| 6,454,949 B1 | * | 9/2002 | Sesay et al. | ................... 210/709 |
| 6,464,883 B2 | * | 10/2002 | So | ............................... 210/716 |
| 6,613,230 B2 | * | 9/2003 | Krulik et al. | ................. 210/638 |
| 6,645,385 B2 | * | 11/2003 | Krulik et al. | ................. 210/709 |
| 6,652,758 B2 | * | 11/2003 | Krulik | ......................... 210/721 |
| 7,157,012 B2 | * | 1/2007 | Umezawa et al. | ........... 210/748 |
| 7,182,873 B2 | * | 2/2007 | Hsien et al. | .................. 210/709 |
| 2004/0262209 A1 | | 12/2004 | Umezawa et al. | |

FOREIGN PATENT DOCUMENTS

| | | |
|---|---|---|
| EP | 1 055 445 A2 | 11/2000 |
| EP | 1 055 446 A2 | 11/2000 |
| EP | 1 055 447 A2 | 11/2000 |
| JP | 6-312190 | 11/1994 |
| JP | 2000-015269 A | 1/2000 |
| JP | 2001-054792 | 2/2001 |
| JP | 2001-219177 A | 8/2001 |
| JP | 2001-276773 A | 10/2001 |
| JP | 2001-334265 A | 12/2001 |
| JP | 2003-071469 A | 3/2003 |
| JP | 2004-042041 A | 2/2004 |
| JP | 2004-249251 A | 9/2004 |

* cited by examiner

*Primary Examiner*—Peter A. Hruskoci
(74) *Attorney, Agent, or Firm*—Morrison & Foerster LLP

(57) ABSTRACT

A wastewater treatment equipment of an embodiment of the present invention neutralizes a WTBT 12 by introducing the WTBT 12 containing fluorine components to a first treatment tank 11A and by introducing an NaOH solution from a second path P2 and so on. The fluorine components contained in the WTBT 12 is then fixed as calcium fluoride by adding calcium components to the WTBT 12 stored in a second treatment tank 11B. Furthermore, MTBR like calcium fluoride are separated from the WTBT in a third treatment tank 11C. The separated MTBR are rinsed and dewatered in a filter press 17.

6 Claims, 9 Drawing Sheets

WASTEWATER TREATMENT EQUIPMENT

BACKGROUND OF THE INVENTION

Priority is claimed to Japanese Patent Application Number JP2005-081438 filed on Mar. 22, 2005, the disclosure of which is incorporated herein by reference in its entirety.

1. Field of the Invention

The present invention relates to a wastewater treatment equipment separating materials to be removed (hereinafter referred to as MTBR) containing hydrofluoric acid components from a water to be treated (hereinafter referred to as WTBT).

2. Description of the Prior Art

From the viewpoints of ecology, reduction of industrial wastes and their separation and reuse are currently important themes. Various fluids containing MTBR are included in these industrial wastes.

Although they are described by various words such as sewage, wastewater, and waste liquid, those fluids including water and chemicals containing MTBR will be called wastewater and will be described below. There are cases where this wastewater is reused after becoming a clean fluid due to the removal of the MTBR using an expensive filtration treatment equipment and so on. Furthermore, there are also cases where the MTBR separated from this wastewater are treated as the industrial wastes. Water in particular is discharged to nature or reused after being turned into a clean state by filtration, which meets environmental standards.

Moreover, a copious amount of wastewater is produced during manufacturing processes of a semiconductor device. Among the processes, wastewater containing a fluorine component like hydrofluoric acid is discharged during an etching process. It is known that the balance of ecosystems will be disturbed when wastewater with a high concentration of fluorine components is discharged to nature. Accordingly, it is extremely important industrially to remove fluorine components from wastewater.

On the other hand, a standard value in terms of discharge of wastewater containing fluorine components is set by the Water Pollution Prevention Law, ordinances of local governments, and so on. Specifically, the concentration of fluorine components contained in the wastewater has to be 8 mg/L or lower. Furthermore, there is also a possibility that the total volume control of fluorine components discharged will be carried out.

Numerous removal methods are proposed as the methods for removing fluorine components described above. A method for carrying out biological treatments and chemical treatments in separate treatment tanks as the method for removing fluorine components contained in the wastewater is proposed for instance in Japanese Patent Application Publication No. 2001-54792 (Document 1). Another method for carrying out the removal of fluorine components is described for instance in Japanese Patent Application Publication No. Hei 06-312190 (Document 2). In this method, after preparing a plurality of reaction tanks, a seed agent containing substances in a sol state is formed by adding calcium components to raw water stored in one reaction tank, and fluorine components is treated by adding the seed agent to raw water stored in the other reaction tank. Furthermore, there is also a treatment method for obtaining sludge by chemically precipitating fluorine components contained in the wastewater using polymer flocculants.

However, in the treatment method of wastewater containing fluorine components described in the aforementioned Document 1, since a plurality times of treatment steps of the wastewater is required, increase in a facility scale has been a problem. Accordingly, a cost for the wastewater treatment increases. Furthermore, since the treatment of organic components using living organisms is carried out, difficulties in carrying out a stable wastewater treatment have been a problem.

Furthermore, in the treatment method of the wastewater described in the aforementioned Document 2, since a concentration of fluorine components contained in the wastewater is extremely low, there has been a problem that other treatment steps like chemical precipitation for carrying out a solidification of the obtained fluorine components.

Moreover, a production of sludge in large amounts as an industrial waste has been a problem when removing fluorine components in wastewater by coagulating sedimentation using commercially available macromolecular coagulants. Furthermore, a difficulty in reusing sludge containing a large amount of coagulant has also been a problem.

SUMMARY OF THE INVENTION

An object of the present invention is to provide a wastewater treatment equipment for removing fluorine components from WTBT without using coagulants.

The wastewater treatment equipment of the present invention includes a neutralizing device for neutralizing WTBT containing MTBR containing fluorine components; a forming device for forming calcium fluoride by adding calcium components to the WTBT; and a separating device for separating the MTBR containing calcium fluoride from the WTBT.

Moreover, the wastewater treatment equipment of the present invention includes a first tank containing WTBT mixed with the MTBR containing fluorine components; the neutralizing device for neutralizing the WTBT by adding alkaline sources to the first tank; a second tank containing the neutralized WTBT; and the forming device for forming calcium fluoride by adding calcium components to the second tank; a third tank containing the WTBT containing the calcium fluoride; and the separating device for separating the MTBR containing the calcium fluoride contained in the third tank from the WTBT.

Furthermore, the neutralizing device includes maintaining pH of the WTBT between 7 and 8 in the wastewater treatment equipment of the present invention.

Additionally, the separating device includes being a filtration equipment immersed in the WTBT in the wastewater treatment equipment of the present invention.

Moreover, it includes filtering the WTBT by a self-assembled membrane formed on a surface of the filtration equipment in the wastewater treatment equipment of the present invention.

In addition, it includes a dewatering device for dewatering the MTBR separated from the WTBT in the wastewater treatment equipment of the present invention.

Furthermore, it includes a removal device for removing neutralized salt from the MTBR separated from the WTBT in the wastewater treatment equipment of the present invention.

Moreover, the forming device includes the addition of calcium chloride to the WTBT in the wastewater treatment equipment of the present invention.

Furthermore, it includes adding the MTBR obtained by being peeled off the self-assembled membrane to the second tank in the wastewater treatment equipment of the present invention.

DETAILED DESCRIPTION OF THE PREFERRED EMBODIMENTS

First Embodiment

Figure 1:
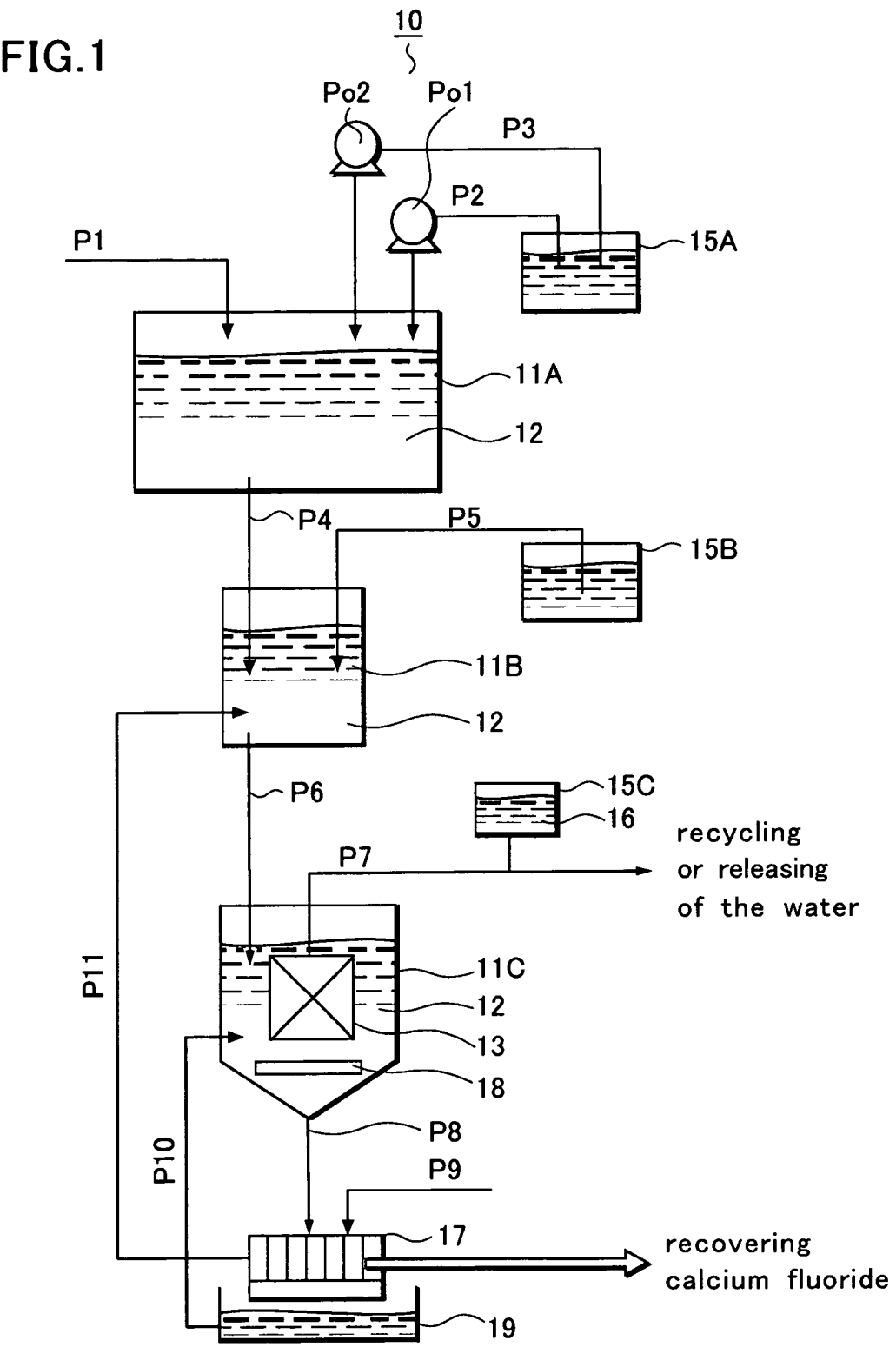
FIG. 1 is a schematic diagram describing a wastewater treatment equipment of a first embodiment of the present invention.
Figure 2:
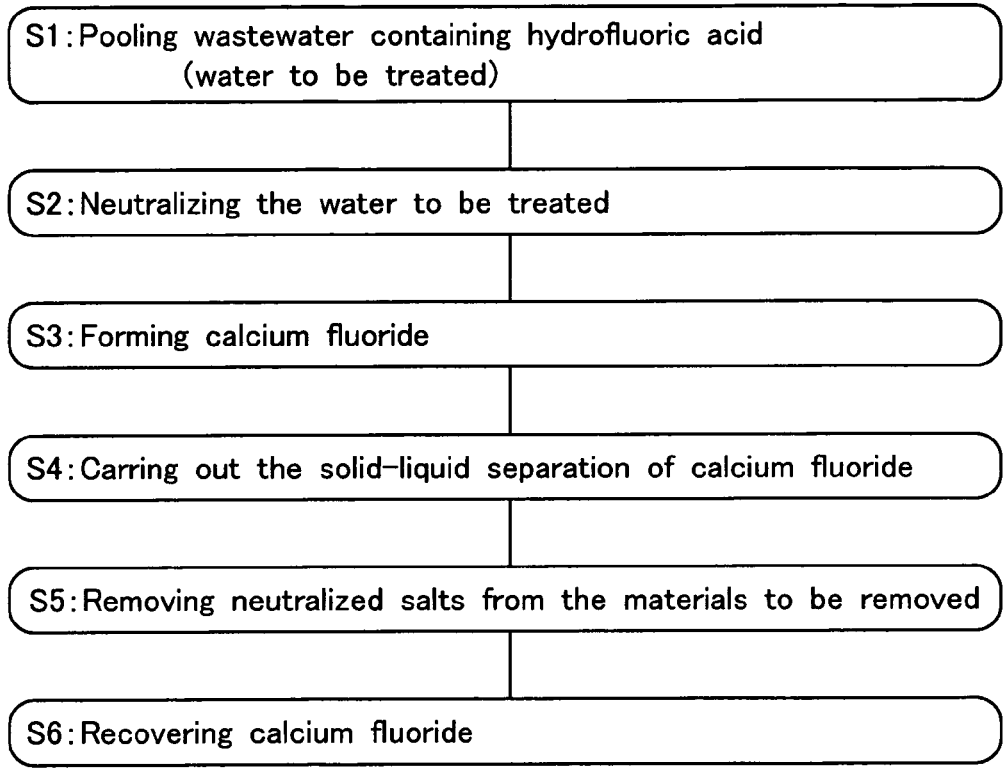
FIG. 2 is a flow diagram describing a treatment method using the wastewater treatment equipment of the first embodiment of the present invention.
Figure 3:
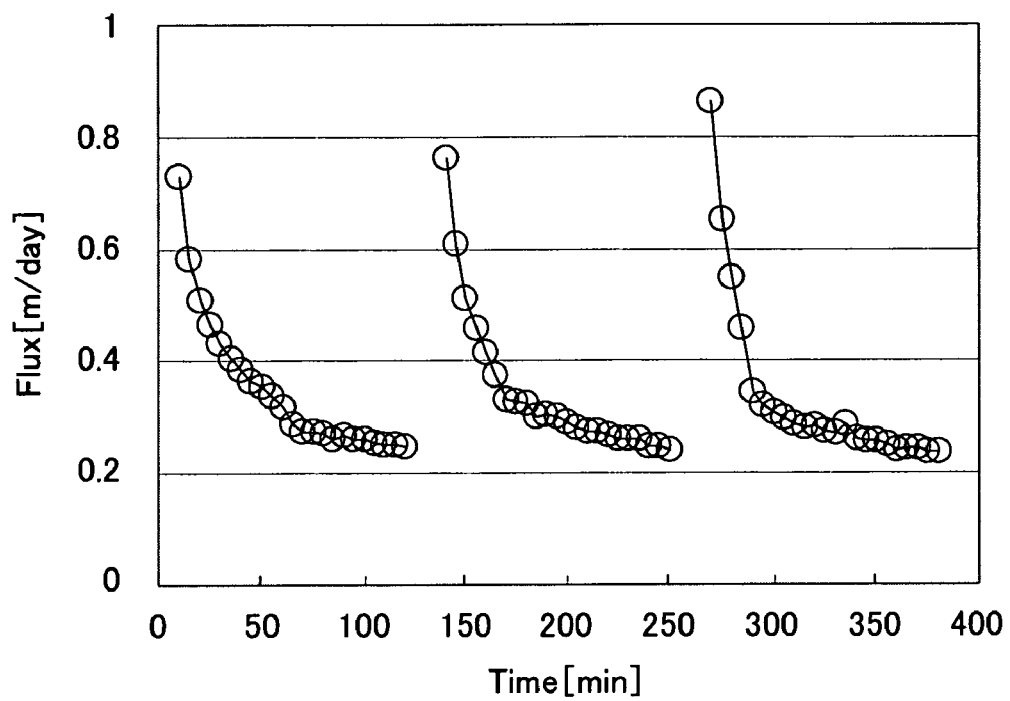
FIG. 3 is a characteristic diagram describing a characteristic of the wastewater treatment equipment of the first embodiment of the present invention.

A configuration of a wastewater treatment equipment 10 for carrying out treatments of a WTBT (wastewater) containing fluorine components and a treatment method of the wastewater by using the equipment will be described in the preferred embodiment of the present invention. FIG. 1 is a diagram showing the configuration of the wastewater treatment equipment 10, FIG. 2 is a flowchart showing the treatment method of the wastewater, and FIG. 3 is a graph showing an experimental result.

The configuration of the wastewater treatment equipment 10 will be described by referring to FIG. 1. The wastewater treatment equipment of the preferred embodiment of the present invention mainly includes a first treatment tank 11A which stores a WTBT 12 containing a hydrofluoric acid, and in which neutralization thereof is carried out, a second treatment tank 11B forming calcium fluoride by adding calcium components to fluorine components contained in the neutralized WTBT 12, a third treatment tank 11C separating calcium fluoride from the WTBT 12, and a filter press 17 obtaining solid calcium fluoride. By the wastewater treatment equipment 10 with such configuration, it is possible to obtain calcium fluoride with a high purity while fluorine components are removed from the WTBT.

Firstly, the WTBT 12 which is treated will be described. The WTBT which is treated in the preferred embodiment of the present invention is a wastewater containing fluorine components. This wastewater is that discharged during an etching step in semiconductor manufacturing plants. More specifically, a copious amount of wastewater containing fluorine components is discharged from a step for carrying out the etching of semiconductors, glasses, and metals. A hydrofluoric acid is used in order to improve a corrosiveness at the time of etching in these etching steps. Here, the hydrofluoric acid is an aqueous solution of a hydrogen fluoride (HF). Therefore, the wastewater discharged from this step contains the hydrofluoric acid, which is highly hazardous.

Each element constituting the wastewater treatment equipment 10 is described in detail below.

A first path P1 is a waterway formed of pipes and so on, and by this path, the WTBT 12 containing the hydrofluoric acid is transported to the first treatment tank 11A. A pump for transporting the WTBT can be interposed in the first path P1. Since the wastewater containing the hydrofluoric acid is a strong acid with a pH of approximately 2, the first treatment tank 11A is formed from materials like glass, which are excellent in acid resistance. Approximately 10,000 mg/L of fluorine components ($F^-$) is contained in the WTBT 12 supplied from the first path P1.

A capacity of the first treatment tank is favorably approximately three times as large as those of the second and the third treatment tanks 11B and 11C described below, or larger. By this, it is possible to pool the WTBT 12 discharged intermittently in the first treatment tank 11A and to treat continuously the pooled WTBT 12 in the second and the third treatment tanks 11B and 11C.

A second and a third paths P2 and P3 are functioning as neutralizing device supplying a neutralizing agent (NaOH) pooled in a first chemical tank 15A to the first treatment tank 11A. Here for example, a solution containing 25 weight % of NaOH is adopted as the neutralizing agent. A pH of the WTBT 12 pooled in the first treatment tank 11A is adjusted between 7 and 8 for example by supplying the neutralizing agent by these paths. Although neutralized salts are formed by carrying out a neutralization treatment of the WTBT 12, these neutralized salts are removed afterwards. A removal method of the neutralized salts will be described later.

In the second path P2, a first pump Po1 with a large size is interposed and in the third path P3, a second pump Po2 with a relatively small size is interposed. By supplying the neutralizing agents using a plurality of paths with pumps of different outputs as described above being interposed, neutralization of the WTBT 12 can be carried out at an early stage and also correctly. Specifically, when the neutralizing agents are supplied to the WTBT constantly, the pH rapidly changes its values when close to 7, which makes it difficult to maintain the pH of the WTBT 12 within a predetermined range. Accordingly, when the pH is low (for example less than pH 6), the pH can be changed at an early stage by supplying the neutralizing agent by the second path P2 interposed by the first pump Po1 with a large output. Furthermore, when the pH is increased (for example pH 6 or higher), the pH of the WTBT 12 can be controlled precisely close to neutral (pH=7) by supplying the neutralizing agent by only the third path P3 interposed by the second pump Po2 with a small output. 99.9% or more of hydrogen fluoride (HF) is dissociated into hydrogen ions ($H^+$) and fluoride ions ($F^-$) (Equation A described below) in the first treatment tank 11A. Moreover, in order to accelerate this dissociation, the WTBT 12 can be stirred by a stirring device like a propeller in the first treatment tank 11A.

$$HF \rightarrow H^+ + F^-$$ 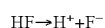 (Eq. A)

A fourth path P4 is a path for transporting the neutralized WTBT 12 in the first treatment tank 11A to the second treatment tank 11B where a fixation of fluorine components takes place. On/off of a pump interposed in the fourth path P4 can be controlled in accordance with a water volume of the WTBT 12 pooled in the first treatment tank 11A. For example, the pump interposed in the fourth path P4 can be operated only when the water volume of the WTBT 12 pooled in the first treatment tank 11A is half the capacity thereof or more. By this, in the first treatment tank 11A, the WTBT 12, which is not less than half of its capacity, can be pooled at all times. Accordingly, even when a large amount of the WTBT 12 of strong acid is flowed into the first treatment tank 11A from the first path P1, a rapid change in the pH of the WTBT 12 pooled in the first treatment tank 11A is suppressed.

A fifth path P5 is a path (a forming device) supplying calcium component from a second chemical tank 15B to a second treatment tank. Specifically, a solution (for example 30 weight %) of calcium chloride ($CaCl_2$) pooled in the second chemical tank 15B is supplied to the second treatment tank 11B via the fifth path P5. Fluorine components contained in the WTBT 12 is fixed as calcium fluoride ($CaF_2$) by adding calcium chloride (Equation B described below). Since calcium chloride has a considerably high solubility product, it is possible to supply a large amount to the WTBT 12. For example, by adding calcium chloride to the WTBT 12 so that calcium ions to become 200 mg/L or higher, it is possible to set a concentration of fluoride ions (F−) contained in the WTBT 12 to 8 mg/L or lower. This concentration of fluoride ions meets a general discharge standard.

$$Ca^{2+} + 2F^- \rightarrow CaF_2 \quad \text{(Eq. B)}$$

Furthermore, calcium chloride pooled in the second treatment tank 11B can be introduced to the third treatment tank 11C for carrying out a solid-liquid separation. By this, since fluorine components can be fixed even inside the third treatment tank 11C, it is possible to further reduce the fluorine components contained in the filtered water.

Calcium hydroxide ($Ca(OH)_2$) can be added to the second treatment tank 11B other than calcium chloride described above. Since the added calcium hydroxide functions as a seed agent for fixing fluorine components, fixation of fluorine components can be accelerated.

Furthermore, a particle size of calcium fluoride can be made 0.25 μm or larger for example by aging the WTBT 12 in the treatment tank 11B. By this, there is an advantage that a membrane separation of calcium fluoride becomes easy. Moreover, pH is maintained between 7 and 8 in the second treatment tank 11B. By these, there is an advantage that colloidal materials are not formed and so that filtration membrane does not clog and the filtration becomes easy in the later steps.

A sixth path P6 is a path for transporting the WTBT 12 containing calcium fluoride from the second treatment tank 11B to the third treatment tank 11C.

MTBR containing calcium fluoride are separated from the WTBT 12 in the third treatment tank 11C. Here, the MTBR are separated from the WTBT 12 by a filtering effect of a filtration membrane 13 (a separating device) immersed in the WTBT 12 stored in the third treatment tank 11C.

The filtration membrane 13 is immersed in the WTBT 12 stored in the third treatment tank 11C and has a function of carrying out the filtration of the WTBT 12. Any filtering mechanism capable of carrying out the filtration in fluid can be adopted as the filtration membrane 13. In the preferred embodiment of the present invention, the solid-liquid separation of calcium fluoride and the WTBT 12 is carried out by performing the filtration using a self-assembled membrane formed on a surface of the filtration membrane 13. Details of this self-assembled membrane will be described later.

The above-described self-assembled membrane can be the self-assembled membrane formed from the MTBR containing calcium fluoride formed in the WTBT 12. In other words, the WTBT 12 is filtered by the MTBR adsorbed onto a filtering surface of the filtration membrane 13. Moreover, this self-assembled membrane is also peeled off from the filtration membrane 13 and recovered at the time when the recovery of calcium fluoride is carried out.

An air diffuser 18 has a function of supplying air bubbles to the filtration membrane 13 from below in the WTBT 12. Specifically, gas is supplied to the air diffuser 18 from a pump not illustrated provided outside and so on. The air bubbles generated from the air diffuser 18 move upward along the filtering surface of the filtration membrane 13. As described so far, it is possible to keep the self-assembled membrane formed on the surface of the filtration membrane 13 with a certain thickness or thinner by generating air bubbles from the air diffuser 18. In this way, it becomes possible to carry out the filtration of the WTBT 12, suppressing the clogging of the self-assembled membrane, and ensuring a flux to some extent.

Inert gases such as helium, neon, argon, or nitrogen gas can be adopted as gases generated from the air diffuser 18. When the air is supplied from the air diffuser 18 to the WTBT 12, there is a concern of carbon oxides contained in the air and fluorine components contained in the WTBT 12 reacting and a reduction in the calcium fluoride concentration. By adopting inert gases as the gases supplied from the air diffuser 18, this concern can be excluded.

A seventh path P7 is a path where the filtered water filtered by the filtration film 13 passes. Filtered water 16 is pooled in a storage tank 15C provided in the seventh path P7. Most of the filtered water passing through the seventh path P7 is either reused or discharged to nature like rivers.

Furthermore, a purification treatment can be carried out with the filtered water passing through the seventh path P7. This purification treatment includes the adjustment of pH, the removal of nitrogen components, and the removal of calcium components. In order to carry out the adjustment of pH, materials of alkaline nature or acidic nature are added to the WTBT after measuring the pH of the WTBT. In order to remove nitrogen components, denitrification method using electrodes is adopted in the preferred embodiment of the present invention. Details of this denitrification method will be described later. Furthermore, calcium components contained in the WTBT 12 is recovered as $CaCO_3$ emerged to the surface of the WTBT by carrying out an electrolytic treatment. The WTBT subjected to such processes is reused or discharged.

Apart of the filtered water filtered by the filtration membrane 13 is pooled in the storage tank 15C and a position of the storage tank 15C is set above a liquid level of the WTBT 12 pooled in the third treatment tank 11C. The filtered water pooled in the storage tank 15C is used by refluxing through the seventh path P7 at the time of peeling off the self-assembled membrane formed on the surface of the filtration membrane 13. Details of this matter will be described later.

An eighth path P8 is a path for transporting solidified MTBR from the third treatment tank 11C to the filter press 17. Specifically, the MTBR deposited on the surface of the filtration membrane 13 and the MTBR precipitated at a bottom of the third treatment tank 11C are transported to the filter press 17. Calcium fluoride is contained with a high purity in the transported WTBT 12.

The MTBR containing calcium fluoride are supplied by the eighth path P8 to the filter press 17 (a dewatering device) and a water content of the MTBR is reduced by carrying out a dewatering treatment. The water content of the MTBR subjected to the dewatering treatment by the filter press 17 is approximately 50 weight % for example. Furthermore, a block of calcium fluoride with a purity of approximately 85 weight % is obtained when drying the MTBR. Calcium fluoride of high purity contained in the MTBR will be reused as a fluorine source.

A ninth path P9 is a path (a removal device) to rinse the neutralized salts contained in the MTBR stored in the filter press 17 by injecting water in the filter press 17. It is possible to improve a purity of calcium fluoride contained in the MTBR stored in the filter press 17 by injecting water in the filter press 17. A neutralized salt (NaCl) of approximately 15 weight % is contained in the MTBR neutralized in the first treatment tank 11A. Most parts of the neutralized salts are discharged outside from the filter press 17 by injecting water in the filter press 17 from the ninth path P9. Moreover, calcium fluoride with a size larger than those of neutralized salts remains inside the filter press 17.

The water injected in the filter press 17 is pooled tentatively in a receiving tank 19. The WTBT pooled in the receiving tank 19 is sent back to the third treatment tank 11C via a tenth path P10 and filtered.

An eleventh path P11 is a path for transporting the MTBR dewatered by the filter press 17 to the second treatment tank 11B where calcium fluoride is formed. The MTBR deposited on the surface of the filtration membrane 13 are stored in the filter press 17 and a high concentration of calcium fluoride is contained in these MTBR. Accordingly by sending back the MTBR mainly formed from calcium fluoride to the second treatment tank 11B, it is possible to accelerate the chemical reaction in the second treatment tank 11B and to fix most of fluorine components contained in the WTBT 12 as calcium fluoride.

The configuration described so far is that of the wastewater treatment equipment 10, which is the preferred embodiment of the present invention. Here, the above-described second and third treatment tanks 11B and 11C can be a single treatment tank. For this reason, it is possible to carry out the fixation of fluorine components and the solid-liquid separation in the single tank and to miniaturize the overall facility.

Next, a wastewater treatment method using the above-described wastewater treatment equipment 10 will be described by referring to FIG. 2. The wastewater treatment method of the preferred embodiment of the present invention is constituted of a first step S1 for pooling wastewater of hydrofluoric acid, a second step S2 for neutralizing the WTBT, a third step S3 for forming calcium fluoride, a fourth step S4 for carrying out the solid-liquid separation of calcium fluoride, a fifth step S5 for removing neutralized salts from the MTBR, and a sixth step S6 for recovering calcium fluoride. Each step will be described in detail by referring also to the FIG. 1.

In the step S1, the WTBT 12 discharged from an etching facility in a semiconductor plant and so on is pooled in the first treatment tank 11A. Here, the WTBT 12, which is hydrofluoric acid, is a strong acid with a pH of approximately 2.

In the step S2, the WTBT 12 pooled in the first treatment tank 11A is neutralized. This neutralization treatment is carried out by adding a solution of NaOH pooled in the first chemical tank 15A to the first treatment tank 11A. The pH of the WTBT 12 pooled in the first treatment tank 11A is monitored at all times and the solution of NaOH is added to the WTBT 12 so as to make the pH of the WTBT 12 approximately 7 to 8. Here, KOH can also be adopted as a neutralizing agent other than NaOH. The neutralized WTBT 12 is transported to the second treatment tank via the fourth path P4.

In the step S3, fluorine components are fixed to form calcium fluoride by adding calcium components to the WTBT 12 containing fluorine components. Here, a solution (for example 30 weight %) of calcium chloride ($CaCl_2$) is adopted as calcium components to be added. Even when a large amount of fluorine components are contained in the WTBT 12, since calcium chloride has a high solubility, it becomes possible to add a large amount of calcium chloride to the WTBT 12 and to fix most of fluorine components contained. The WTBT 12 in which contained fluorine components are fixed as calcium fluoride is transported to the third treatment tank 11C.

In the step S4, the MTBR containing calcium fluoride are separated from the WTBT 12 by carrying out a membrane filtration. The self-assembled membrane formed from the MTBR deposited on the surface of the filtration membrane 13 is adopted as a mechanism for carrying out the filtration in the preferred embodiment of the present invention. The filtered water filtered by the filtration membrane 13 is discharged outside, and reused or discharged to nature after further treatments like the pH adjustment are carried out. Since a flux of the self-assembled membrane is gradually reduced in a filtration method using the self-assembled membrane, the self-assembled membrane is peeled off on a regular basis and then reformed. The filtered water 16 is refluxed to the filtration membrane from the storage tank 15C when the self-assembled membrane is peeled off. For this reason, the filtration membrane deposited onto the surface of the filtration membrane 13 is peeled off and precipitated at the bottom of the third treatment tank 11C. Moreover, air bubbles are passed along the surface of the filtration membrane 13 by the air diffuser 18 during the filtration of the WTBT 12 by the filtration membrane 13. In this way, it is possible to maintain filtering capability by controlling a membrane thickness of the self-assembled membrane formed on the surface of the filtration membrane 13. The MTBR concentrated in this step is transported to the filter press 17.

In the step S5, a neutralized salt (NaCl) contained in the MTBR are rinsed and removed by injecting water in the filter press 17. Since the neutralized salts are contained in the WTBT 12 undergone the neutralization treatment, neutralized salts are also contained in the MTBR separated from the WTBT 12 other than calcium fluoride. The neutralized salts are dissolved in water and discharged outside by injecting water in the filter press 17. Since calcium fluoride has a large diameter, it is not discharged outside from the filter press 17 even when rinsed with water. A concentration of calcium fluoride contained in the MTBR is improved by this step.

In the step S6, calcium fluoride is recovered. Specifically, the MTBR in a semi-solidified state are taken out after dewatering the MTBR by the filter press 17. The water content of the MTBR is approximately 50 weight % in this state. A block of MTBR solidified by drying the MTBR is then formed. MTBR containing 85 weight % of calcium fluoride is obtained in the preferred embodiment of the present invention.

In the preferred embodiment of the present invention, a high purity of fixed calcium fluoride can be obtained from the wastewater containing fluorine components by carrying out the solid-liquid separation treatment without using flocculating agents like polymer flocculants. Obtained calcium fluoride can be reused as hydrofluoric acid in a semiconductor manufacturing step and so on by reacting with strong acid (for example sulfuric acid). Furthermore, calcium fluoride of high purity obtained in the embodiment of the present invention can also be used as a flux which is mixed with steel. Moreover, it is also possible to obtain calcium chloride when hydrochloric acid is added to the obtained calcium fluoride. Additionally, since hydrochloric acid and sulfuric acid and so on added for reusing calcium fluoride are chemicals normally stocked in the semiconductor plant, reuse of calcium fluoride can be carried out without adding new facilities in the plant.

Furthermore, in the preferred embodiment of the present invention, fluorine components are fixed by calcium chloride ($CaCl_2$) after carrying out the neutralization treatment of the WTBT using NaOH and so on.

In addition, neutralized salts formed by carrying out the neutralization treatment are removed by carrying out a rinsing treatment. This also contributes in enhancing the purity of calcium fluoride in the MTBR.

An experiment carrying out the filtration of the WTBT 12 using the filtration membrane 13 shown in FIG. 1 will be described by referring to FIG. 3. FIG. 3 is a graph showing a variation in flux with time at the time of carrying out the filtration treatment. A horizontal axis shows time carrying out the treatment continuously and a vertical axis shows the size of the flux.

Firstly, conditions of this experiment will be described. In the present experiment, the filtration was carried out by applying suction pressure of 7 kPa to the filtration membrane with an area of 0.1 $m^2$. Fluorine components are fixed as calcium fluoride in the WTBT by adding calcium chloride to the wastewater containing 1000 mg/L of fluorine ion. A diameter of calcium fluoride is approximately 0.25 μm. The experiment was carried out by measuring an amount and a flux of the WTBT to be treated on a regular basis.

An average flux of 0.4 m/day and the sufficient resistance of the filtration membrane 13 of the preferred embodiment of the present invention for practical use are confirmed by this experiment. Furthermore, the concentration of fluorine components contained in the filtered water obtained by the filtration membrane is 3.5 mg/L and this value is meeting the general discharge standard.

The experimental method will be specifically described. Firstly, the self-assembled membrane is formed on the surface of the filtration membrane by circulating the MTBR like calcium fluoride and the filtration is started at the point where the filtered water with more than certain transparency becomes obtainable.

The flux at the time of starting the filtration is approximately 0.7 m/day and the flux gradually decreases when the filtration continues. This is because the clogging of the self-assembled membrane progresses during the course of the filtration. The flux at the point of 130 minutes after starting the filtration is approximately 0.2 m/day. The self-assembled membrane is peeled off from the filtration membrane at this point and the MTBR concentrated in the WTBT is recovered.

When the peeling of the self-assembled membrane and the recovering of the MTBR are completed, a new self-assembled membrane is formed on the surface of the filtration membrane and the WTBT is filtered again. By repeating the steps described so far, it is possible to separate the MTBR containing calcium fluoride from the WTBT.

It became clear by the above-described experiment that a sufficient flux can be ensured by carrying out the peeling of the self-assembled membrane and its restoration on a regular basis.

Second Embodiment

Figure 4:
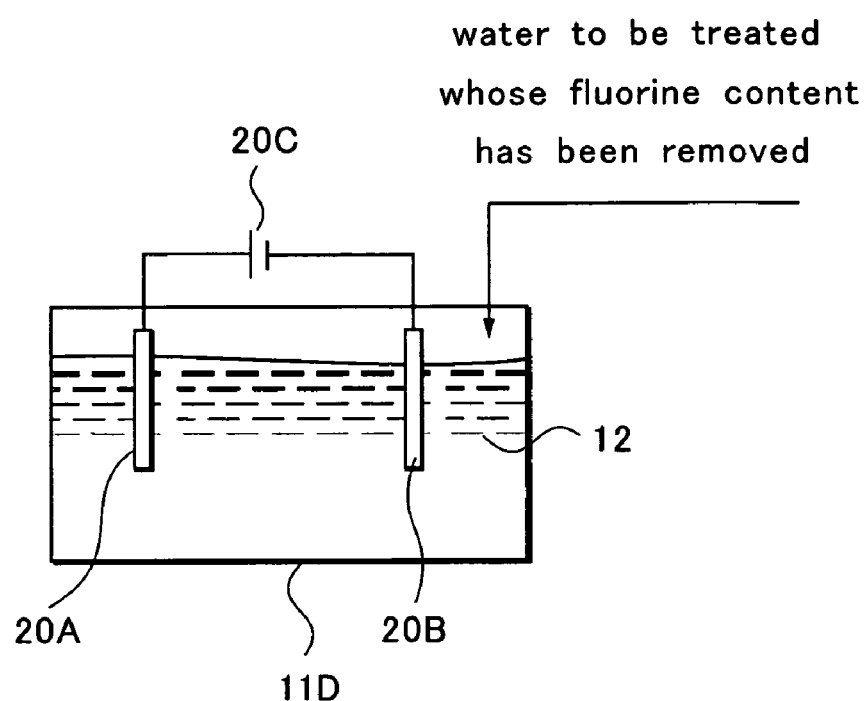
FIG. 4 is a schematic diagram describing the wastewater treatment equipment of a second embodiment of the present invention.

A method of removing nitrogen components and so on from WTBT obtained from a wastewater treatment equipment 10 will be described in the preferred embodiment of the present invention. FIG. 4 is a diagram showing a configuration of a fourth treatment tank 11D for removing nitrogen components.

A WTBT 12 removed of fluorine components by the aforementioned wastewater treatment equipment 10 is introduced to the fourth treatment tank 11D in FIG. 4. Nitrogen components contained in the WTBT 12 are removed by applying voltage to a pair of electrode with at least one part thereof is immersed in the WTBT 12. Details of such nitrogen components removal will be described below in detail.

The electrode pair immersed in the WTBT 12 is constituted of an anode electrode 20A and a cathode electrode 20B, and there is a power source 20C applying voltage to both electrodes. Moreover, a control device for controlling the power source 20C and a stirring device for stirring the WTBT 12 in the tank can be provided.

The cathode electrode 20B can adopt, as its material, a conductive material containing elements in a group 1B, or groups 2B and 8 in the periodic table or conductive materials coated with the same elements. Specifically, the cathode electrode 20B is formed of copper, iron, or alloys of copper and zinc, copper and iron, copper and nickel, or copper and aluminum or sintered body of the same.

Carbon or an insoluble electrode formed of insoluble metals such as platinum, iridium, palladium or its oxide, and so on can be adopted for the anode electrode 20A. Moreover, by providing a screening wall which surrounds the anode electrode 20A, it is possible to prevent oxygen bubbles generated from the anode electrode 20A from moving to the cathode electrode 20B side.

A treatment method of nitrogen components by the electrode formed as described so far will be explained.

Firstly, more than one pairs of the anode electrode 20A and the cathode electrode 20B are immersed in the WTBT 12 and energized. By this, nitrate ions contained in the WTBT 12 are converted to nitrite ions by a reduction reaction in the cathode electrode 20B side (Equation C). Moreover, nitrite ions produced by the reduction reaction of nitrate ions are further converted to ammonia by a reduction reaction (Equation D). Equations C and D are described below.

$$NO_3^- + H_2O + 2e^- \rightarrow NO_2^- + 2OH^- \tag{Eq. C}$$

$$NO_2^- + 5H_2O + 6e^- \rightarrow NH_3\,(aq) + 7OH^- \tag{Eq. D}$$

On the other hand, in the anode electrode 20A side, reactive oxygen and hypochlorous acid are generated from a surface of the anode electrode 20A. By this, nitrogen gas is produced by denitrification effect of ammonia (Equation E). Moreover, in order to accelerate denitrification reaction of ammonia in the anode electrode 20A, halogen ions such as chloride ions, iodide ions, and bromide ions, or compounds containing these halogen ions such as sodium chloride and potassium chloride for example, are added to WTBT. Chloride ions of sodium chloride added to the WTBT are set to, for example, between 10 ppm and 40000 ppm. By this, when sodium chloride is added to the WTBT for example, sodium chloride is oxidized on the anode to generate chlorine (Equation F). The generated chlorine reacts with water and produce hypochlorous acid (Equation G). The produced hypochlorous acid then reacts with ammonia present in the WTBT and is converted to nitrogen gas after going through a plurality of chemical changes (Equation H). Equations E to H are shown below. Furthermore, since there is a case where calcium chloride is added to the WTBT 12 in the preferred embodiment of the present invention, chloride ions ionized from calcium chloride are present in the WTBT 12. For this reason, an electrolytic treatment to remove nitrogen components from the WTBT 12 becomes easy, which is an advantage.

$$NH_3(aq)+3(O) \rightarrow N_2\uparrow +3H_2O \quad \text{(Eq. E)}$$

$$NaCl \rightarrow Na^+ + Cl^- \, 2Cl^- \rightarrow Cl_2 2e^- \quad \text{(Eq. F)}$$

$$Cl_2 + H_2O \rightarrow HClO + HCl \quad \text{(Eq. G)}$$

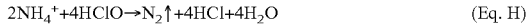
$$2NH_4^+ + 4HClO \rightarrow N_2\uparrow + 4HCl + 4H_2O \quad \text{(Eq. H)}$$

By this, nitrogen components, such as nitrate nitrogen, nitrite nitrogen, and ammonia nitrogen and so on, in the WTBT can be treated in the tank.

Furthermore, calcium components contained in the WTBT become $CaCO_3$ by the above-described electrolytic treatment and emerge to the surface of the WTBT. Calcium components remained in the WTBT 12 can be then recovered by recovering this $CaCO_3$, which comes up. Furthermore, it is possible to reuse the recovered $CaCO_3$. Additionally, the neutralization treatment in order to set the pH of the WTBT close to neutral can be carried out in this third treatment tank.

Third Embodiment

In the embodiment of the present invention, details of a filtering mechanism applicable as a filtration membrane 13 immersed in a WTBT 12 in the first embodiment will be described. Although the filtering mechanism using a self-assembled membrane will be explained in the embodiment described below, a filtration equipment of other forms of embodiment can also be applied to the present invention.

Figure 5:
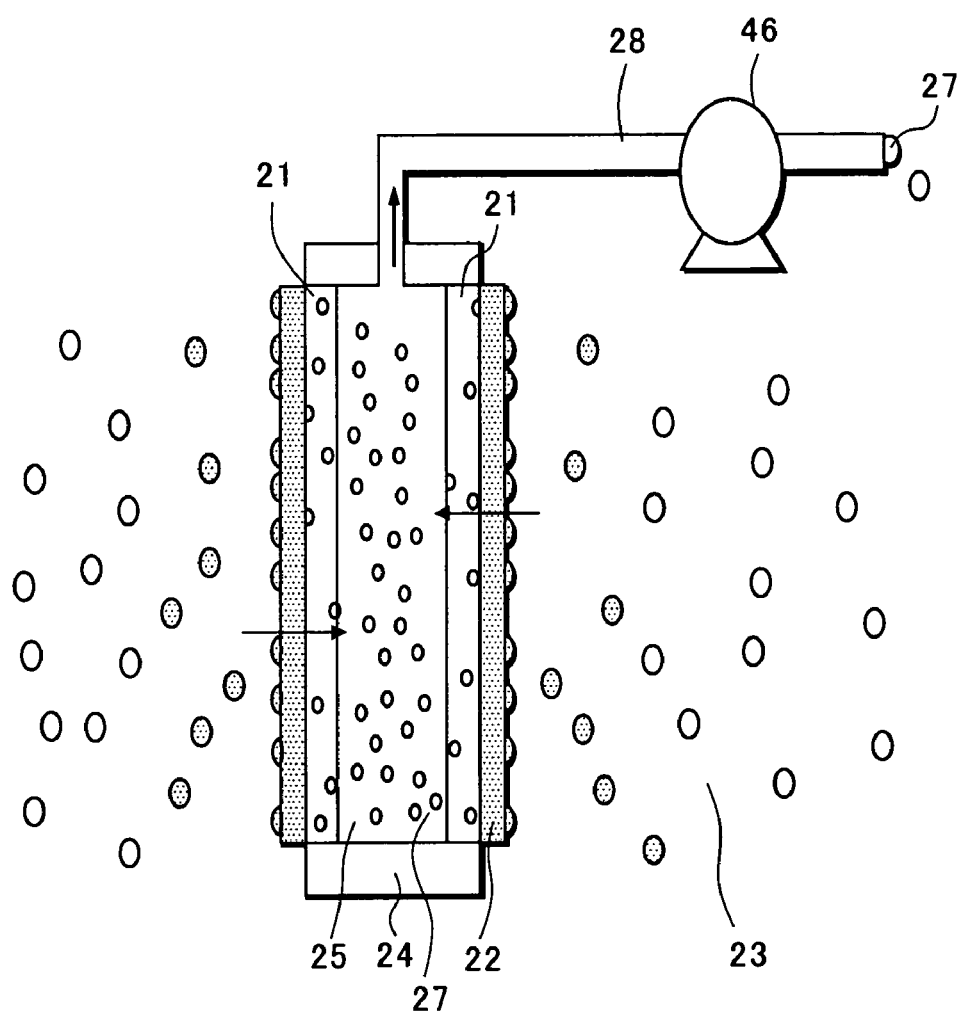
FIG. 5 is a diagram describing a filter equipment applied to the wastewater treatment equipment of a third embodiment of the present invention.

The filter equipment used in the preferred embodiment of the present invention removes a a material to be removed, which is calcium fluoride, by a filter formed from the self-assembled membrane formed from the MTBR, as shown in FIG. 5 and other figures to follow.

To describe it specifically, the filter equipment of the preferred embodiment of the present invention has the self-assembled membrane to become a second filter 22 formed from calcium fluoride, which is the material to be removed. The filter 22 is formed on a surface of a first filter 21, which is formed from organic polymers. The WTBT containing the MTBR is filtered using the second filter 22, which is the self-assembled membrane.

Either organic polymers or ceramics can be adopted for the first filter 21 in theory as long as the self-assembled membrane can attach thereto. Polymer membrane formed from polyolefins with an average pore size of 0.25 μm and a thickness of 0.1 mm is adopted here. A photograph of a surface of this filter membrane formed from polyolefins is shown in FIG. 6B.

Moreover, the first filter 21 has a flat membrane structure provided on both surfaces of a frame 24 and immersed in a fluid so as to become perpendicular thereto. A filtrate 27 can be taken out by suction using a pump 46 from a hollow portion 25 of the frame 24.

The second filter 22 attaches to an entire surface of the first filter 21, and is the self-assembled membrane which is solidified by sucking flocs of the MTBR. This self-assembled membrane can be one aggregated into forms of gel or cake.

A description will be given on a formation of the second filter 22, which is the self-assembled membrane of the MTBR as described above. And also given is a description on the filtration whereby the MTRB is removed. Here, calcium fluoride is diffused in the WTBT 12 in a particulate state.

Figure 6A:
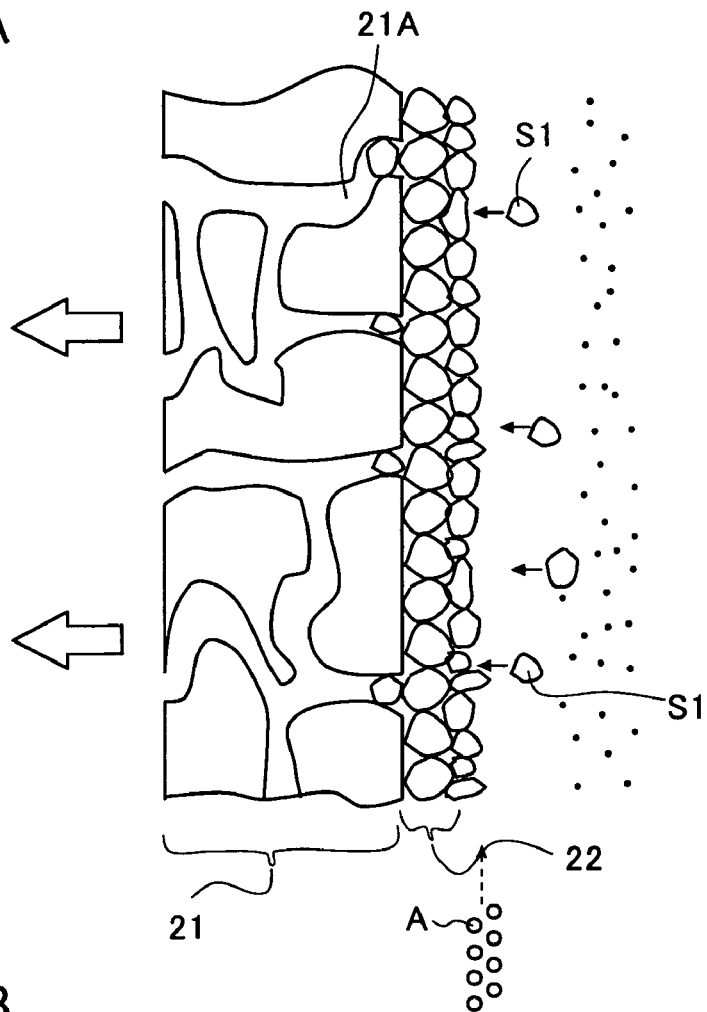
FIG. 6A is a diagram describing an operating principle of the filter equipment and FIG. 6B is an enlarged diagram of a first filter, respectively of the third embodiment of the present invention.
Figure 6B:
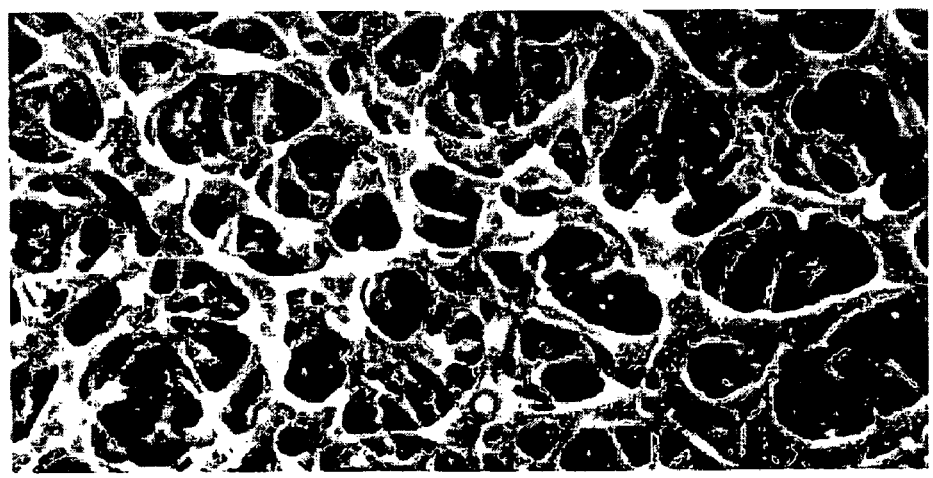

As shown in FIG. 6A, the first filter 21 has a number of filter pores 21A. The second filter 22 is the self-assembled membrane of the MTBR formed in a layered form in openings of the filter pores 21A and on the surface of the first filter 21. Flocs of the MTBR formed from calcium fluoride are present on the surface of the first filter 21 and these flocs are sucked by suction pressure from a pump and dried (dewatered) and immediately solidified due to the sucking up of water content in a fluid. Thus the second filter 22 is formed on the surface of the first filter 21.

Since the second filter 22 is formed from flocs of the MTBR, predetermined membrane thickness is immediately obtained, and the filtration of flocs of the MTBR will be started using the second filter 22. Accordingly, when the filtration continues while being sucked by the pump 46, the self-assembled membrane of the flocs is deposited on a surface of the second filter 22 and becomes thick. Before long, the clogging of the second filter 22 makes it impossible to continue the filtration. Meanwhile, calcium fluoride in the MTBR attaches to the surface of the second filter 22 while being solidified, and the WTBT passes through the first filter 21 to be taken out as filtered water.

In FIG. 6A, the WTBT mixed with the MTBR is present on one side of the first filter 21, and the filtered water passed through the first filter 21 is produced on the opposite side of the first filter 21. The WTBT is sucked and flows in a direction shown by an arrow. Flocs in the WTBT 12 are solidified by this suction as they approach the first filter 21. Furthermore, the self-assembeled membrane of binding flocs is adsorbed onto the surface of the first filter 21 and the second filter 22 is formed. Owing to the function of the second filter 22, the filtration of the WTBT will be carried out, while the MTBR in a solution being solidified.

By gently sucking the solution of the WTBT via the second filter 22 as described so far, water content of the WTBT can be taken out as the filtered water. The MTBR are dried, solidified, and deposited onto the surface of the filter 22, and flocs of the MTBR are captured as the self-assembled membrane.

The first filter 21 is immersed in the WTBT while standing perpendicularly thereto, and the WTBT is in a state where the MTBR are dispersed. When the WTBT is sucked with a weak suction pressure by the pump 46 via the first filter 21, flocs of the MTBR bound to each other on the surface of the first filter 21 and are adsorbed thereon. Note that, since the filtered water circulates back to the WTBT in the forming step of the second filter 22, flocs S1 with diameters smaller than that of the filter pores 21A passing through the first filter 21 cause no problem. In this step of forming the filter, the flocs S1 are deposited forming gaps of various shapes. By being sucked with an extremely weak suction pressure, the second filter 22 is formed as a soft self-assembled membrane with an extremely high degree of swelling. Water content the WTBT is sucked, permeating through this self-assembled membrane with a high degree of swelling, and is taken out as the filtered water passing through the first filter 21. Thus, the WTBT is eventually filtered.

Moreover, by sending air bubbles A from the bottom of the WTBT, a co-flow is formed in the WTBT along the surface of the first filter 21. This is for attaching the second filter 22 uniformly to the entire surface of the first filter 21 and for attaching in such a gentle way as forming gaps in the second filter 22. Although air flow rate is set to 1.8 l/min specifically, it is chosen depending on a membrane quality of the second filter 22.

In the next filtration step, by a weak suction pressure, the flocs S1 formed of calcium fluoride are gradually deposited on the surface of the second filter 22, and are absorbed thereon. The purified water is taken out as the filtered water from the first filter 21 by permeating through the second filter 22 and the deposited flocs S1.

However, when filtration continues for a long time, above-described gaps are also clogged before long, due to the thick attachment of the self-assembled membrane on the surface of the second filter 22. Thus, taking out the filtered water becomes impossible. Therefore, it becomes necessary to remove this deposited self-assembled membrane in order to restore filtering capability.

Subsequently, a filter equipment in a more specific form will be described by referring to FIG. 7.

Figure 7:
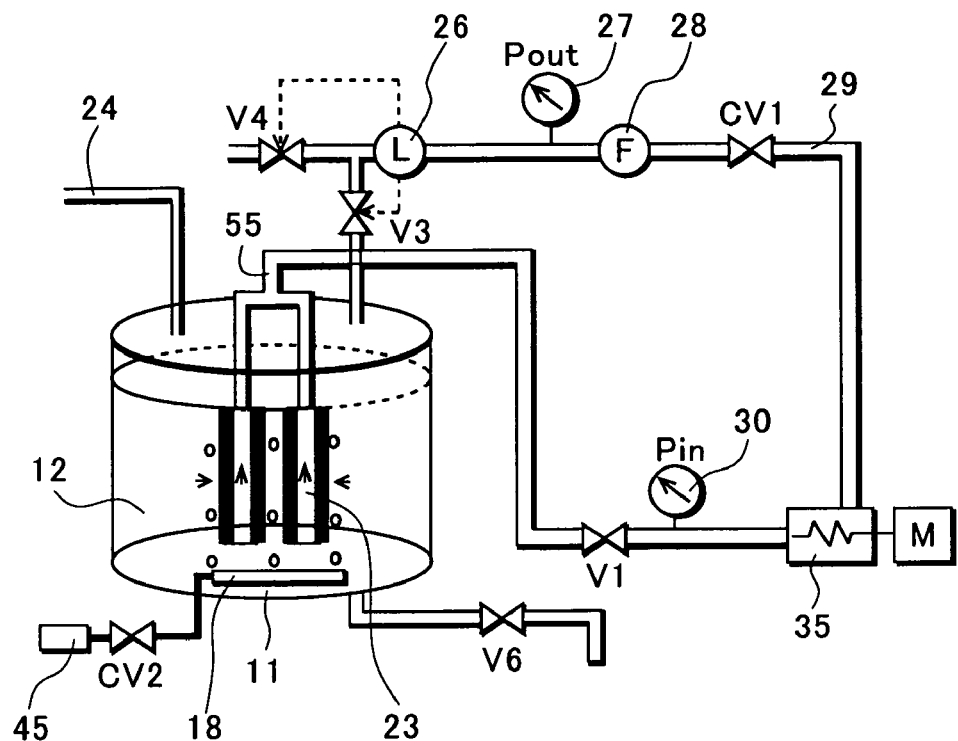
FIG. 7 is a diagram describing a materialized filter equipment applied to the wastewater treatment equipment of the third embodiment of the present invention.

A pipe 24 is provided as a supply device of the WTBT in an upper side of a treatment tank 11 in FIG. 7. The pipe 24 introduces the fluid (wastewater) mixed with the MTBR to the treatment tank 11. Here, what is introduced to the treatment tank 11 is the wastewater containing calcium fluoride being formed by adding calcium components to the wastewater containing hydrofluoric acid.

A plurality of filter equipments 23 with the second filter being installed in the WTBT pooled in the treatment tank 11. An air diffuser 18, such as a pipe with small holes and a bubbling apparatus used in water tanks for fish, is provided in a lower side of the filter equipment 23. Its position is adjusted so as to make the bubbles pass along a surface of the filter equipment 23 precisely. This air diffuser 18 is placed all over the base of the filter equipment 23 so as to be capable of supplying air bubbles uniformly to all the surface thereof. An air pump is described with a reference numeral 45.

A pipe 55 is fixed onto the filter equipment 23. A filtered fluid filtered by the filter equipment 23 flows through the pipe. The pipe is connected to a magnet pump 35, which carries out a suction via a valve V1. A pipe 29 is connected from the magnet pump 35 to valves V3 and V4 via a control valve CV1. Moreover, a first pressure gauge 30 is provided behind the valve V1 of the pipe 55 to measure a suction pressure Pin. Furthermore, a flowmeter 28 and a second pressure gauge 27 are provided behind the control valve CV1 of the pipe 29. The flowmeter 28 controls the flow rate so as to achieve a constant flow rate. Additionally, the air flow rate from the air pump 45 is controlled by the control valve CV2.

The WTBT 12 supplied from the pipe 24 is pooled in the treatment tank 11 and is filtered by the filter equipment 23. The surface of the second filter 22 attached to the filter equipment 23 is maintained so as not to lower its filtering capability by air bubbles passing through and co-flow generated by their climbing power and burst, which move the MTBR adsorbed onto the second filter 22 and make them adsorb all over the surface of the filter equipment 23 uniformly.

Here, the filter equipment 23 immersed in the treatment tank 11 will be described by referring to FIG. 8.

Figure 8A:
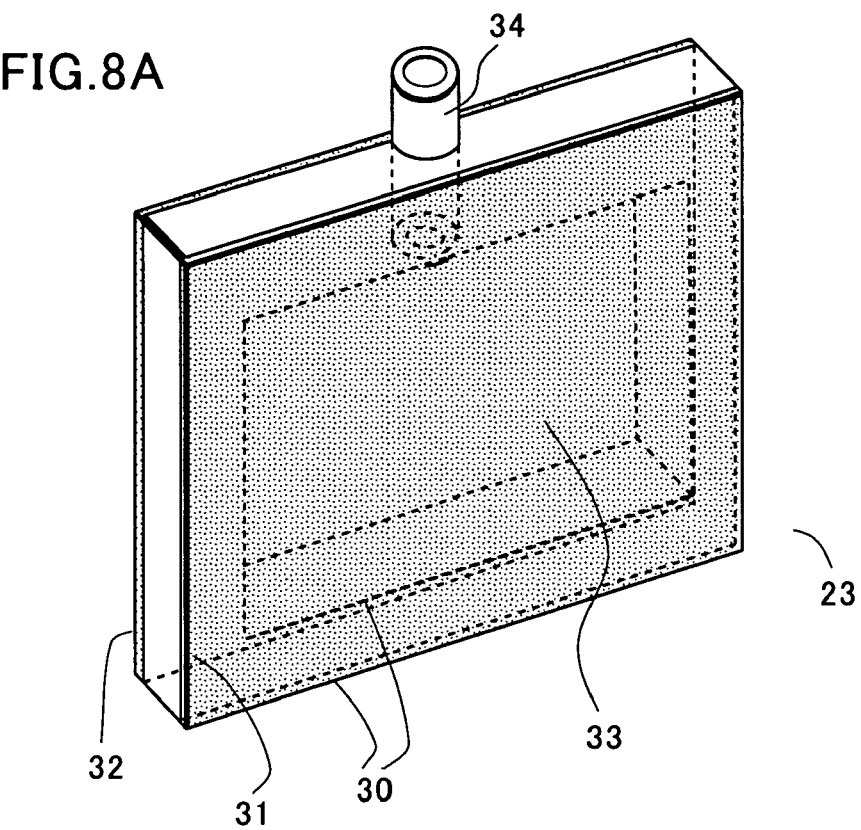
FIGS. 8A, 8B, and 8C are perspective views describing the filter equipment applied to the wastewater treatment equipment of the third embodiment of the present invention.
Figure 8C:
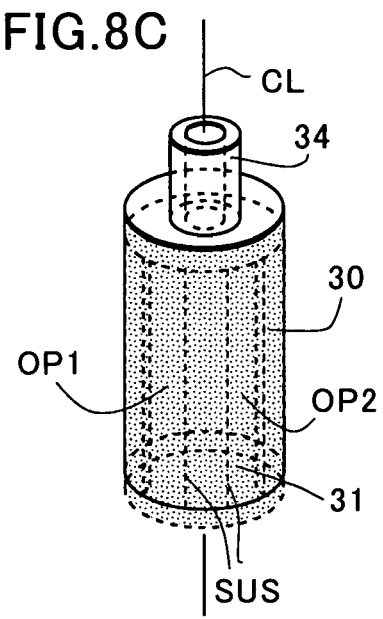

A reference numeral 30 shown in FIG. 8A describes a frame of a shape like a casing having a function of supporting the entire filter equipment 23. Filter membranes 31 and 32 to become the first filter 21 are pasted to and fixed on both sides of this frame 30. By sucking a pipe 34, a filtrate filtered by the filter membranes 31 and 32 flows into an inner space 33 surrounded by the frame 30, and filter membranes 31 and 32. The filtered water is taken out via the pipe 34 which is sealed and attached to the frame 30. The filter membranes 31 and 32 and the frame 30 are completely sealed so that the WTBT does not penetrate to the space 33 except from the filter membranes.

Figure 8B:
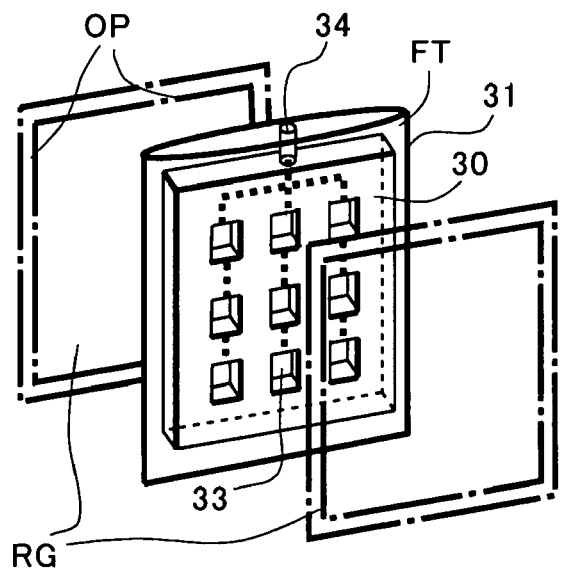

Since the filter membranes 31 and 32 in FIG. 8A are thin resin films, they can be warped inward leading to their rupture when sucked. Shown in FIG. 8B is a solution to this. Although only 9 of the spaces 33 are shown in FIG. 8B, more of them are actually formed. In addition, the filter membrane 31 actually adopted is a polymer membrane of polyolefins with a thickness of approximately 0.1 mm. Furthermore, a thin filter membrane, which is shown as FT here, is formed in a bag shape as shown in FIG. 8B. The frame 30 integrated with the pipe 34 is inserted in this bag shaped filter FT and the frame 30 and the filter FT are pasted together. A reference numeral RG shows a holding device for holding rims, on which filter FT is pasted from both sides. The filter FT is exposed from an opening OP of the holding device.

The one shown in 8C is the filter equipment itself formed into a cylinder type. A frame attached to the pipe 34 is a cylinder type and is provided with openings OP1 and OP2 on a side surface thereof. Since portions of side surface corresponding to openings OP1 and OP2 are removed, a supporting device SUS, which supports the filter membrane 31, is provided between the openings. The filter membrane 31 is pasted on the side surface of the supporting device SUS.

Subsequently, an actual filtration method will be described specifically by referring to a mechanism shown in FIG. 7. Firstly, the WTBT 12 mixed with the MTBR containing fluorine components is put in the treatment tank 11 via the pipe 24. The filter equipment 23, which has only the first filter 21 but doesn't have the second filter 22 formed, is thereafter immersed in the treatment tank 11, and the WTBT is circulated while sucking with a weak suction pressure by the pump 35 via the pipe 55. A circulation path includes the filter equipment 23, the pipe 55, the valve V1, the pump 35, the pipe 29, the control valve CV1, the flowmeter 28, a light sensor 26, and the valve V3. The WTBT is sucked from the treatment tank 11 and is put back to the treatment tank 11.

The second filter 22 is formed on the first filter 21 of the filter equipment 23 by circulation and eventually the MTBR formed of calcium fluoride is captured.

In other words, when the WTBT is sucked with a weak suction pressure by the pump 35 via the first filter 21, particles of the MTBR are readily solidified and adsorbed on the surface of the first filter 21. The solidified flocs of the MTBR which are larger than the filter pores 21A of the first filter 21, are adsorbed and deposited onto the surface of the first filer 21, forming the second filter 22 formed from the self-assembled membrane. Note that although the flocs pass through the first filter 21, together with the formation of the second filter 22, water in the WTBT is sucked through the self-assembled membrane as a passage and taken out as the purified water, that is, the WTBT is filtered.

A concentration of the flocs contained in the filtered water is monitored by the light sensor 26. The filtration is started after confirming that the flocs are lower than a desired mixing ratio. When the filtration is started, the valve V3 is closed by the detection signals from the light sensor, the valve V4 is opened, and the aforementioned circulation path is closed. Accordingly, the purified water is taken out from a valve 4. Air bubbles supplied from the air pump 45 and adjusted by the control valve CV2 are supplied to the surface of the filter equipment 23 from the air diffuser 18.

When the filtration continues successively, the concentration of the MTBR in the WTBT increases since the water content in the WTBT is taken outside the treatment tank 11 as the purified water. In other words, the WTBT 12 is concentrated and its viscosity increases. For this reason, the WTBT is supplied to the treatment tank 11 from the pipe 24 to enhance the efficiency of filtration by suppressing the increase in the concentration of the WTBT. However, the self-assembled membrane is thickly attached onto the surface of the second filter 22 of the filter equipment 23. Before long comes a state wherein the filtration is impossible to be carried out since the second filter 22 is clogged.

When the second filter 22 of the filter equipment 23 is clogged, restoring of the filtering capability of the second filter 22 is carried out. In other words, the pump 35 is stopped and the negative suction pressure applied to the filter equipment 23 is released.

Figure 9A:
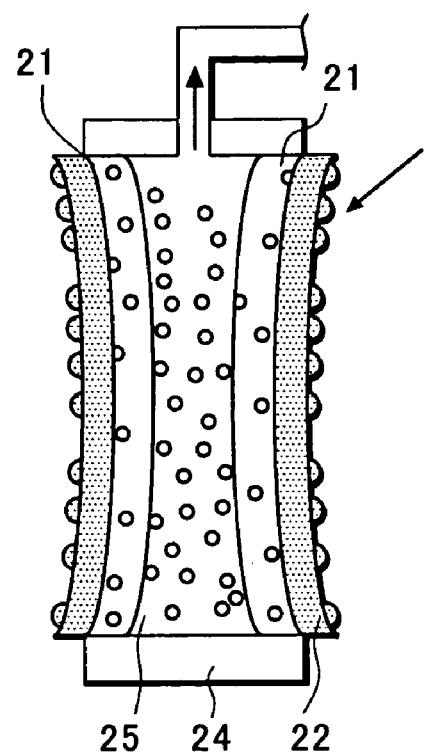
FIGS. 9A and 9B are cross-sectional views describing a restore of the filter equipment applied to the wastewater treatment equipment of the third embodiment of the present invention.

The restoring step will be described in further detail by referring to the schematic diagram shown in FIG. 9. FIG. 9A shows a state of the filter equipment 23 in the filtration step. The first filter 21 is in a shape, which bowed inward since a hollow portion of the first filter 21 has a negative pressure compared to that of outside due to the weak suction pressure. Accordingly, the second filter 22 adsorbed on the surface thereof is also in a shape, which bowed inward in a similar way. Furthermore, the self-assembled membrane gradually adsorbed onto the surface of the second filter 22 is in a similar shape.

Figure 9B:
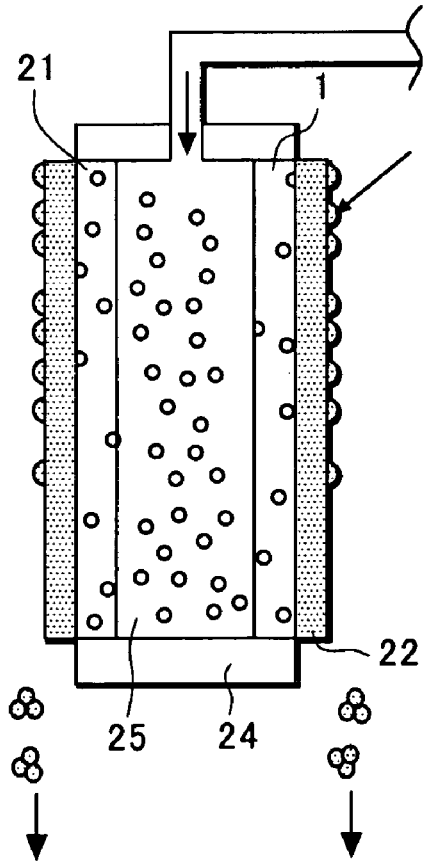

However, as shown in FIG. 9B, the first filter 21 of the filter equipment 23 returns to the original state in the restoring step, since this weak suction pressure is stopped and the pressure inside of the filter equipment goes back to the normal atmospheric pressure. The second filter 22 and the self-assembled membrane adsorbed onto the surface thereof also returns in similar ways due to this. As a result, since the suction pressure adsorbing the self-assembled membrane is firstly lost, the self-assembled membrane lose adsorbability to the filter equipment 23 while receiving a force to expand outward at the same time. For this reason, the adsorbed self-assembled membrane starts to desorb from the filter equipment 23 due to its own weight. Furthermore, it is favorable that the amount of air bubbles from the air diffuser 18 nearly doubles in order to accelerate this desorption. According to the experiment, the desorption starts from a lower end of the filter equipment 23 and the self-assembled membrane of the second filter 22 on the surface of the first filter 21 desorbes like an avalanche and settles on the bottom of the treatment tank 11. The second filter 22 is favorably formed once again by circulating the WTBT by the aforementioned circulation path thereafter. The second filter 22 goes back to the original state in this restoring step, returns to a state where it is capable of carrying out the filtration of the WTBT, and carries out the filtration of the WTBT 15 again.

Furthermore, the filtered water refluxing to the hollow portion 25 in this restoring step helps the first filter 21 return to the original state. A hydrostatic pressure of the filtered water is applied, and a force to expand outward is further applied. In addition, the filtered water bleeds out to a boundary between the first filter 21 and the second filter 22 from inside the first filter 21 via the filter pores 21A, and accelerates the desorption of the self-assembled membrane of the second filter 22 from the surface of the first filter 21. The above-described reflux can be caused by flowing filtered water 16 pooled tentatively in a storage tank 15C shown in FIG. 1 to the filtration membrane.

When the filtration continues while the second filter 22 as described above being restored, the concentration of the MTBR in the WTBT stored in the treatment tank 11 increases and the WTBT also comes to be of a considerably high viscosity before long. Accordingly, when the concentration of the MTBR in the WTBT exceeds a predetermined concentration, the filtration operation is halted and is left for precipitation. Concentrated slurry is then accumulated on the bottom of the treatment tank 11, and this concentrated slurry in a form of a cake is recovered. The concentrated slurry which is recovered is compressed or heat dried and is further compressed its amount by removing the water contained therein. Furthermore, this slurry can be reused as a hydrofluoric acid source.

According to the wastewater treatment equipment of the embodiment of the present invention, the WTBT containing fluorine components is neutralized by the neutralizing device and thereafter forms calcium fluoride. Accordingly, it becomes possible to add necessary as well as sufficient amount of calcium components to the WTBT in order to fix fluorine components contained in the WTBT and it becomes possible to obtain the MTBR with a high calcium fluoride content. Therefore, reuse of obtained calcium fluoride is readily possible. Furthermore, it is possible to achieve a high degree of removal of fluorine components from the WTBT.

What is claimed is:

1. A wastewater treatment equipment comprising:
    a first tank storing a wastewater containing a material comprising fluorine;
    a neutralizing device adding sodium hydroxide or potassium hydroxide to the first tank so as to neutralize the wastewater;
    a second tank storing the neutralized wastewater;
    a forming device adding a calcium compound to the second tank so as to form calcium fluoride;
    a third tank storing the wastewater containing the calcium fluoride;
    a separating device separating the calcium fluoride from the wastewater stored in the third tank,
    wherein the separating device comprises a filtration equipment and a self-assembled membrane comprising calcium fluoride formed on a surface of the filtration equipment, and the filtration equipment is configured so that the self-assembled membrane comprising calcium fluoride is peeled off a dewatering device for dewatering the peeled off calcium fluoride; and a path for transporting the dewatered calcium fluoride to the second tank.

2. The wastewater treatment equipment according to claim 1, wherein the neutralizing device maintains the pH of the wastewater between 7 and 8.

3. The wastewater treatment equipment according to claim 1, further comprising a removal device removing a neutralized salt containing sodium or potassium from the dewatered calcium fluoride separated in said dewatering device.

4. The wastewater treatment equipment according to claim 1, wherein the calcium compound is calcium chloride.

5. The wastewater treatment equipment according to claim 1, further comprising a fourth tank receiving the water separated from the calcium fluoride in said dewatering device, wherein the water received by the fourth tank is returned to the third tank.

6. The wastewater treatment equipment according to claim 1, wherein the dewatering device comprises a filter press, the peeled off calcium fluoride is placed in the filter press and rinsed with water to remove a neutralized salt containing sodium or potassium, and water is separated from the rinsed wastewater by the filter press.

* * * * *